US006705101B2

(12) United States Patent
Brotz et al.

(10) Patent No.: US 6,705,101 B2
(45) Date of Patent: Mar. 16, 2004

(54) VEHICLE COOLING SYSTEM FOR A TEMPERATURE-RAISING DEVICE AND METHOD FOR THE COOLING OF A TEMPERATURE-RAISING DEVICE

(75) Inventors: Friedrich Brotz, Stuttgart (DE); Herbert Damsohn, Aichwald (DE); Peter Geskes, Stuttgart (DE); Klaus Luz, Herrenberg (DE); Conrad Pfender, Besigheim (DE)

(73) Assignee: BEHR GmbH & Co., Stuttgart (DE)

( * ) Notice: Subject to any disclaimer, the term of this patent is extended or adjusted under 35 U.S.C. 154(b) by 0 days.

(21) Appl. No.: 10/163,423

(22) Filed: Jun. 7, 2002

(65) Prior Publication Data

US 2002/0184908 A1 Dec. 12, 2002

(30) Foreign Application Priority Data

Jun. 9, 2001 (DE) .......................... 101 28 164

(51) Int. Cl.[7] .................. F25B 41/00; F25D 23/12
(52) U.S. Cl. .......................... 62/198; 62/259.2
(58) Field of Search ................ 62/259.2, 198, 62/199, 244, 239, 228.4; 236/91 C (56) References Cited

U.S. PATENT DOCUMENTS 5,386,704 A  2/1995  Benedict 5,634,349 A * 6/1997 Kakehashi et al. ............ 62/198
6,059,027 A * 5/2000 Lake et al. .................. 165/204
6,341,496 B1  1/2002 Kettner et al.

FOREIGN PATENT DOCUMENTS

| DE | 41 24 889 | 1/1993 |
| DE | 42 09 188 | 2/1994 |
| DE | 693 01 747 T2 | 7/1996 |
| DE | 198 18 649 | 10/1999 |
| DE | 199 25 744 | 12/2000 |

* cited by examiner

Primary Examiner—Chen Wen Jiang
(74) Attorney, Agent, or Firm—Foley & Lardner (57) ABSTRACT

The invention relates to a vehicle cooling system (1) for a temperature-raising device (4), especially a drive battery or fuel cell, preferably for an electric or hybrid vehicle. The system has a coolant (7) that cools the device (4) with the involvement of an air-conditioning system (8) that serves for air-conditioning of the vehicle passenger compartment. It is preferred that the coolant (7) be a liquid coolant, which is carried in a cooling circuit (2) and for cooling of the liquid to be thermally integrated into the refrigeration circuit (3) of the air-conditioning system. The invention further relates to a method for cooling a temperature-raising vehicle device.

21 Claims, 12 Drawing Sheets

VEHICLE COOLING SYSTEM FOR A TEMPERATURE-RAISING DEVICE AND METHOD FOR THE COOLING OF A TEMPERATURE-RAISING DEVICE

CROSS-REFERENCE TO RELATED PATENT APPLICATIONS

The right of priority under 35 U.S.C. §119(a) is claimed based on German Patent Application No. 101 28 164.1, filed Jun. 9, 2001, the entire disclosure of which is hereby incorporated by reference.

BACKGROUND OF THE INVENTION

The invention relates to a vehicle cooling system for a temperature-raising device, especially a drive battery or fuel cell, preferably for an electric or hybrid vehicle. The system employs a coolant that cools the device in cooperation with the air-conditioning system that serves for air-conditioning the passenger compartment of the vehicle.

In known production hybrid vehicles the drive battery (which constitutes a temperature-raising device) is cooled by air flowing through it. Since on hot days the outdoor air temperature exceeds 30° C., in such cases it is not the ambient air that is used to cool the battery but air from the passenger compartment. Although this air originates from outside the vehicle, it has been cooled and if necessary dried by an air-conditioning system before flowing into the passenger compartment. This known air cooling concept has the disadvantage that the battery cooling capacity is heavily dependent on the air temperature in the passenger compartment. Thus, over short distances, the air temperature in the passenger compartment may far exceed the 30° C. required as a minimum. Furthermore, the passenger compartment temperature is dependent upon the subjective perception of the vehicle occupants. If adequate cooling of the battery is not possible, the hybrid drive will no longer be able to provide the vehicle with full drive power. Moreover, a relatively poor heat transmission takes place between the cooling air and the battery, so that only correspondingly low thermal loads can be dissipated. Operating situations are therefore possible, in which the thermal load actually dissipated is more than 70% below the thermal load to be dissipated.

SUMMARY OF THE INVENTION

One object of the present invention is to provide an improved cooling system for a temperature-raising device, especially a drive battery or fuel cell, preferably for an electric or hybrid vehicle.

A specific object of the invention is to create a vehicle cooling system of the aforementioned type, in which significantly greater amounts of heat can be dissipated. It is intended, in particular, that the air temperature in the passenger compartment should exert extremely little, if any influence.

A further object of the invention is to provide a method for cooling a temperature-raising device in a vehicle.

Still another object of the invention is to provide an improved vehicle of the type having a temperature-raising device comprising a drive battery and/or a fuel cell as part of the propulsion unit for the vehicle.

In accordance with one aspect of the present invention, there has been provided a cooling system for a temperature-raising device of a vehicle having an air-conditioning system that serves for air-conditioning of the passenger compartment of the vehicle and that includes a refrigeration circuit. The cooling system comprises a cooling circuit for cooling the temperature-raising device, wherein the cooling circuit is designed for circulating a liquid coolant for cooling the temperature-raising device and is thermally integrated into the refrigeration circuit of the air-conditioning system.

In accordance with another aspect of the invention, there is provided a method for cooling a temperature-raising device in a vehicle having a passenger compartment, comprising: cooling the vehicle device by a circulated liquid coolant; and directly exchanging heat between the coolant and a refrigerant of an air-conditioning system serving for air-conditioning the passenger compartment of the vehicle.

In accordance with still another aspect of the invention, there has been provided a vehicle, comprising: a temperature-raising device comprising at least one of a drive battery and a fuel cell as part of the propulsion unit for the vehicle; an air-conditioning system that serves for air-conditioning the passenger compartment of the vehicle and that includes a refrigeration circuit; and a cooling system for the temperature-raising device of the comprising a cooling circuit as defined above.

Further objects, features and advantages of the present invention will become apparent from the detailed description of preferred embodiments that follows, when considered together with the accompanying figures of drawing.

DETAILED DESCRIPTION OF PREFERRED EMBODIMENTS

According to the invention, the coolant is preferably a liquid coolant, which is carried in a coolant circuit, and the cooling thereof is achieved by thermal integration into the refrigeration circuit of the air-conditioning system. While in the prior art the air-conditioning system is used only indirectly for battery cooling, by drawing a fraction of the air that has been cooled by the vehicle air-conditioning system from the passenger compartment and delivering it to flow around the battery before being released into the outside atmosphere, the invention proposes that the air-conditioning system be coupled directly to the temperature-raising device that is to be cooled.

According to the invention, a coolant circuit is provided, that is to say, a coolant is circulated and in so doing cools the device. After contact with the device, the coolant used is therefore reused and is available for a renewed cooling cycle. It is thermally integrated into the refrigeration circuit of the air-conditioning system, so that the coolant circuit is thermally coupled to the air-conditioning system. Thus, the refrigerant likewise circulating in the air-conditioning system can, to the required extent, exert an influence on the coolant circuit directly and hence efficiently, without other intermediate streams of cooling medium.

A liquid coolant is used which has considerably better heat transmission, heat absorption and heat removal characteristics than the known air cooling. In the refrigerant cycle of the air-conditioning system, a refrigerant is used which, in the course of its cycle, is evaporated, then compressed and eventually condensed, whereupon it assumes the vaporous phase again due to expansion. Any conventional engine coolant solution can be used as the liquid coolant. Preferably a water-GLYSANTIN™ mixture is employed. Other liquid coolants that are capable of dissipating the thermal load of the temperature-raising device are also suitable. Owing to its very good transmission of heat, the liquid coolant is capable of dissipating large amounts of heat from the device, for example, from the walls of the battery cells, even in the case of a cooling cycle with a relatively small volumetric flow rate.

According to a preferred embodiment of the invention, the coolant is associated by way of a first heat exchanger with the refrigerant of the air-conditioning system. Such a heat exchanger ensures a very good heat transmission between the coolant and the refrigerant and leads to said direct linking of the air-conditioning system to the coolant circuit. Nevertheless, the cooling medium streams or circuits of the two heat exchangers are separated from one another, that is to say they do not communicate with one another.

A further embodiment of the invention provides that the liquid coolant retains its physical state at all times. The liquid phase is therefore maintained throughout the entire cycle in the coolant circuit.

The coolant circuit has at least one circulating pump. This serves to pump the coolant either constantly or at intervals, preferably dependent on the temperature. In the process, the coolant passes through the heat exchanger, which provides the thermal link to the drive battery.

The refrigerant circuit of the air-conditioning system has at least one compressor, at least one condenser, at least one expansion valve and at least one first evaporator serving for air-conditioning. The evaporator of the air-conditioning system serves for cooling the air of the vehicle passenger compartment. It absorbs the heat of the passenger compartment air. The refrigerant vapor arriving from the evaporator is compressed in the downstream compressor and condensed in the condenser, with a rise in temperature. The heat produced in the process is preferably given off to the outside air.

That part of the first heat exchanger (from the coolant circuit) associated with the refrigerant circuit of the air-conditioning system forms a second evaporator. The refrigerant of the air-conditioning system is therefore evaporated partially in the first evaporator and the remainder, in particular, in the second evaporator. The first evaporator absorbs the heat from the air of the passenger compartment; the second evaporator serves to absorb the heat generated by the temperature-raising device. The "associated part" of the first heat exchanger refers to that area of the first heat exchanger which carries the refrigerant of the air-conditioning system. Another corresponding part of the heat exchanger, which carries the coolant stream, is assigned to the coolant circuit. Accordingly, the two parts of the heat exchanger are in close thermal contact, that is to say there is very good heat transmission.

The arrangement may be configured in such a way that the first and second evaporators are separate elements or, alternatively, form one basic unit.

For controlling/regulating the evaporator capacity or evaporator capacities, the first and/or the second evaporator is/are each provided with a bypass. The respective bypass allows the refrigerant to entirely or partially bypass the corresponding evaporator, so that only a correspondingly reduced heat exchange, if any, takes place there. For exerting a defined influence, the bypass or each bypass may have a control valve and/or regulating valve. The control valve or regulating valve is adjusted as a function of parameters that influence the cooling process of the cooling system. The temperature of the temperature-raising device, the outside air temperature and/or the passenger compartment temperature, for example, may be used as parameters.

The vehicle cooling system may be operated in such a way that overheating occurs in the cycle of the air-conditioning system (refrigeration circuit). The refrigerant is brought up to an overheating temperature downstream of the first and/or second evaporator. This serves to control or regulate the expansion valve, which is arranged between the condenser and the first or second evaporator and influences the evaporation. Multiple expansion valves may also be provided instead of the one expansion valve. An overheating sensor is provided for detection of the overheating temperature. This sensor is preferably situated at the evaporator outlet. It serves to measure the overheating. The regulation or control of the refrigerant delivered to the evaporator is preferably integrated into the expansion valve. The regulation or control is performed as a function of the overheating measurement.

The first evaporator is situated upstream or downstream of the second evaporator. The terms "upstream" and "downstream" relate to the direction of flow of the refrigerant in the air-conditioning system. It is therefore possible, as an alternative, for the flow to pass firstly through the second evaporator assigned to the temperature-raising device and then through the first evaporator assigned to the passenger compartment of the vehicle. Alternatively, an inverse order is also conceivable. In both of the cases referred to, the evaporators are therefore connected in series. Alternatively, a parallel connection may also be provided. This means that a partial volumetric flow of the refrigerant passes the first evaporator and another partial volumetric flow or the remaining partial volumetric flow of the refrigerant passes the second evaporator. With more than two evaporators, a combination of series connection and parallel connection may be provided.

A further embodiment of the invention provides for a third evaporator, situated downstream of the first evaporator in the direction of the refrigerant flow, the third evaporator forming an integral part of a second heat exchanger for cooling the temperature-raising device. The second evaporator is therefore situated upstream of the first evaporator, and the third evaporator downstream of the first evaporator (in each case viewed in the direction of flow of the refrigerant for the air-conditioning system). The three evaporators are therefore connected in series. The first evaporator serves for cooling the passenger compartment air; the second and third evaporators serve for cooling the temperature-raising device. The second evaporator therefore constitutes a sub-assembly of the first heat exchanger, and the third evaporator forms a sub-assembly of the second heat exchanger. Each of the two heat exchangers represents a connecting link between the cooling circuit and the refrigeration circuit. Provision can be made, in particular, for the first and the second heat exchangers to each form separate elements or alternatively for the first and second heat exchangers to form one unit.

In addition to cooling the temperature-raising device by means of the air-conditioning system referred to, the cooling circuit may also contain at least one additional coolant radiator. In such a case, the coolant is cooled both by the air-conditioning system and by this radiator, which does not belong to the air-conditioning system. This may be a radiator through which the air stream flows, for example. The additional radiator increases the cooling capacity. The radiator may be connected in parallel or in series with the first and/or second heat exchanger.

Finally, the invention relates to a method for cooling a temperature-raising vehicle device, in particular a drive battery or fuel cell, preferably for an electric or hybrid vehicle. The vehicle device is cooled by a circulated liquid coolant, and an exchange of heat occurs between the coolant and the refrigerant of an air-conditioning system serving for the air-conditioning of the vehicle passenger compartment.

Figure 1:
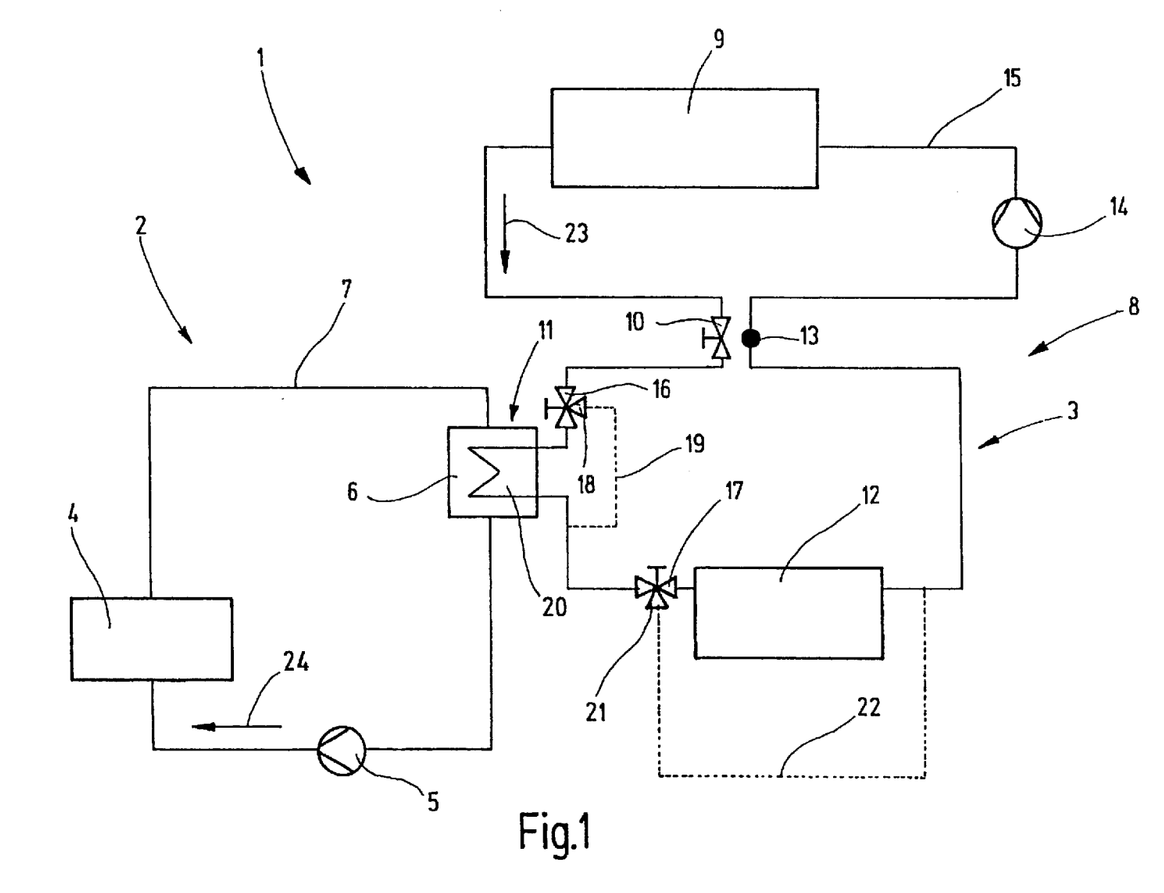
FIG. 1 is a schematic diagram of a vehicle cooling system according to a first exemplary embodiment of the invention.

Turning now to the drawings, FIG. 1 shows a vehicle cooling system 1, which has a cooling circuit 2 and a refrigeration circuit or cycle 3. The cooling circuit 2 contains a temperature-raising device 4, a circulating pump 5 and a first heat exchanger 6. The cooling circuit 2 is operated with a coolant 7, which is transported in the circuit by the circulating pump 5. The coolant 7 is a typical engine coolant solution (preferably a water-GLYSANTIN™ mixture).

The temperature-raising device 4 may be a vehicle element, which in operation gives off heat. In particular, this may be a (rechargeable) battery or a fuel cell. These devices are necessary, in particular, in the case of electric vehicles or hybrid vehicles. In addition to a main drive unit (internal combustion engine or fuel cell), a hybrid vehicle needs a powerful battery, which generates a very high thermal load that has to be dissipated. Given a high drive power output (in uphill travel, for example), this thermal load may be up to 2 kW. The battery feeds an electric motor, which drives the vehicle. In this respect, the battery constitutes a drive battery. The aforementioned problems also occur in the case of an electric vehicle in which, because there is no internal combustion engine, the vehicle is driven solely by means of electrical energy. In the case of fuel cell vehicles, the main drive takes the form of an electric motor supplied by the fuel cell. By means of a battery, the aforementioned electric motor may be operated additionally in order to assist the fuel cell drive or on its own in order to use the battery for drive purposes instead of the fuel cell. In all the aforementioned variants, there is the problem of cooling the battery or the fuel cell, that is to say a temperature-raising device, that generates heat which must be dissipated.

The invention also uses an air-conditioning system 8 for cooling the temperature-raising device 4, that is to say, the air-conditioning system 8 serves, on the one hand, for regulating the temperature of the passenger compartment of the vehicle, and according to the invention, it assumes the further function of contributing to the cooling of the temperature-raising device 4. As a result, significantly higher thermal loads can be dissipated from the device 4. In FIG. 1 the air-conditioning system 8 is represented by the refrigeration circuit 3. It has a condenser 9, an expansion valve 10 with an overheating sensor 13 performing an overheating measurement at the evaporator outlet, an associated part 11 of the first heat exchanger 6, a first evaporator 12 and a compressor 14. The expansion valve 10 forms a structural unit with the overheating detection. The associated part 11 of the first heat exchanger 6 forms a second evaporator 20 in respect of the cooling circuit 3. These components are connected to one another by way of a piping system, in which a refrigerant 15 is circulated by means of the compressor 14. The refrigerant is preferably R134a.

FIG. 1 shows that two 3-way valves 16 and 17 are additionally arranged in the refrigeration circuit 3. The 3-way valve 16 is situated between the expansion valve 10 and the associated part 11 of the first heat exchanger 6, and has a branch 18 to a bypass 19, which lies parallel to the associated part 11 of the first heat exchanger 6. The other 3-way valve 17 is situated between the first evaporator 12 and the second evaporator 20 and has a branch 21, from which a bypass 22 lying parallel to the first evaporator 12 emerges.

The resultant function is as follows: the refrigerant 15 in the liquid state flows from the condenser 9 to the expansion valve 10. The refrigerant is fed by the compressor 14. The feed direction is identified by the arrow 23. The refrigerant 15 is expanded by the expansion valve 10. In the second evaporator 20, the refrigerant 15 begins to evaporate. In the first evaporator 12 the refrigerant 15 is completely evaporated. In the process, the second evaporator 20 absorbs heat from the cooling circuit 2, and the first evaporator 12 is capable of cooling the air flowing past it, which is used for cooling the vehicle passenger compartment. In the first evaporator 12 a slight overheating of the refrigerant 15 occurs, which is measured on the hot gas side (overheating sensor 13) and directly regulates or controls the adjustment of the amount of refrigerant on the injection side (expansion valve 10) by means of a needle. The expansion valve 10 is therefore preferably controlled or regulated as a function of the temperature measurement of the overheating sensor 13. The compressor 14 compresses the refrigerant 15, so that under heating at high pressure it condenses in the condenser 9, the heat preferably being given off to the outside air.

In the cooling circuit 2, the coolant 7, which is a liquid coolant, is fed in the direction of the arrow 24 by means of the circulating pump 5, so that it passes the temperature-raising device 4 and in so doing absorbs heat, that is to say, the temperature-raising device 4 is cooled. The coolant 7 then passes to the first heat exchanger 6, where through the heat exchange function it can give its heat off to the refrigeration circuit 3. The liquid coolant 7 retains its liquid state at all times in the cooling circuit 2.

In order to be able to switch, as required, between simple cooling of the temperature-raising device 4, that is battery cooling, for example, and purely air-conditioning mode, or in order to be able to adjust the relative proportions of the refrigerant mass flows, with which the two evaporators 12 and 20 evaporate the refrigerant 15, the bypasses 19 and 22 can be influenced by means of the 3-way valves 16 and 17. Depending on the position of the 3-way valve 16, all the refrigerant 15 flows through the second evaporator 20, or there is only a partial through-flow or no through-flow at all, according to how far the bypass 19 is opened. It is therefore possible to control the evaporator 12 accordingly, so that either all the refrigerant 15 flows through the latter, or some or all of it flows around the evaporator by way of the bypass 22.

Figure 2:
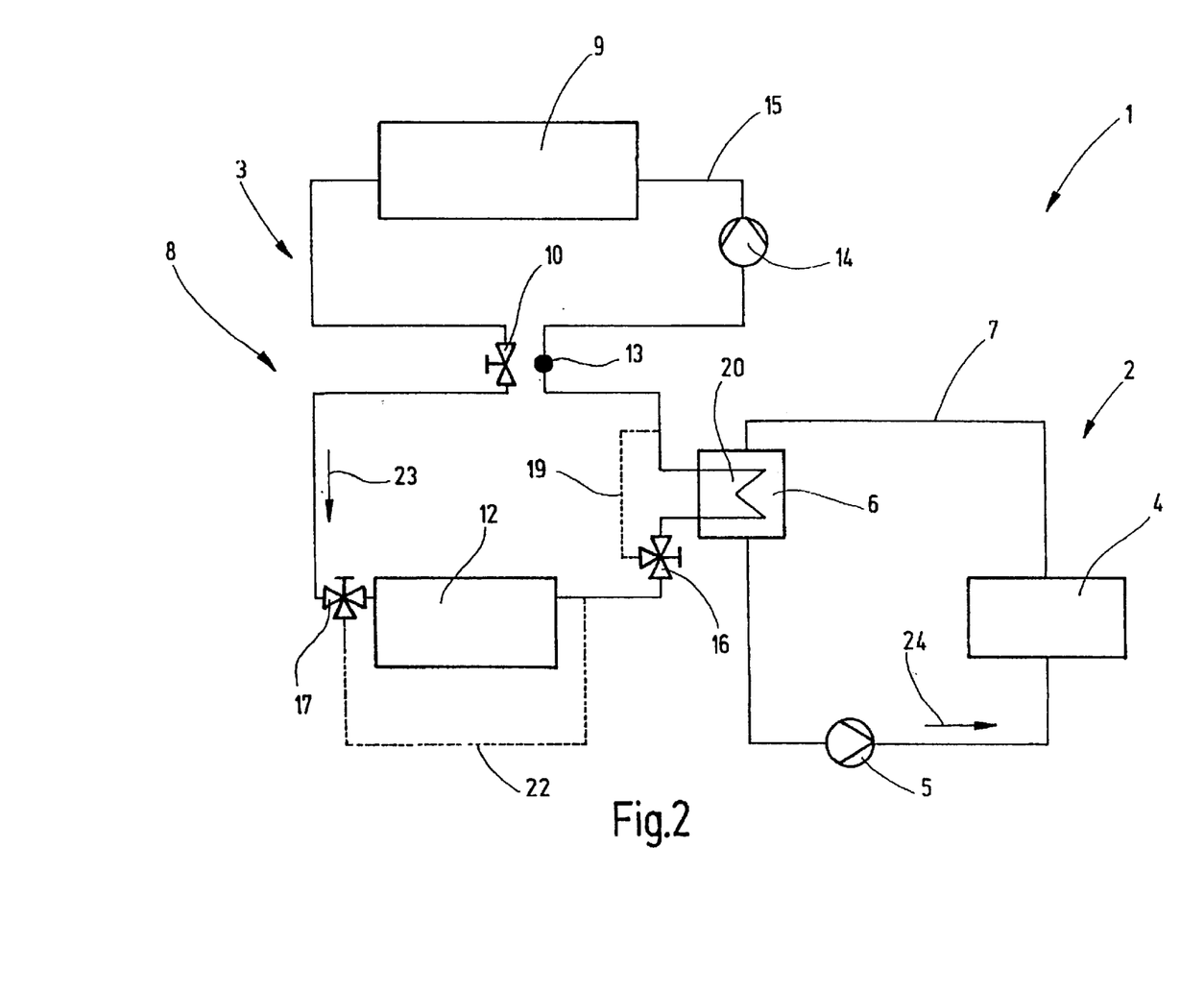
FIG. 2 is a schematic diagram of a further vehicle cooling system according to a further exemplary embodiment.

FIG. 2 shows an exemplary embodiment in which, viewed in the direction of flow of the refrigerant 15 in the refrigeration circuit 3 (arrow 23), the flow coming from the expansion valve 10 first passes through the first evaporator 12 and then the second evaporator 20 of the first heat exchanger 6. Compared to the exemplary embodiment in FIG. 1, therefore, the position of the two evaporators 12 and 20 in the direction of flow of the refrigerant 15 is reversed. Overheating of the refrigerant 15 also occurs in the exemplary embodiment in FIG. 2, but in this case in the second evaporator 20. Here too, the expansion valve 10 is controlled or regulated according to the degree of overheating. Otherwise the construction of the exemplary embodiment in FIG. 2 corresponds to that of the exemplary embodiment in FIG. 1, so that reference may be made to the text associated with FIG. 1.

Figure 3:
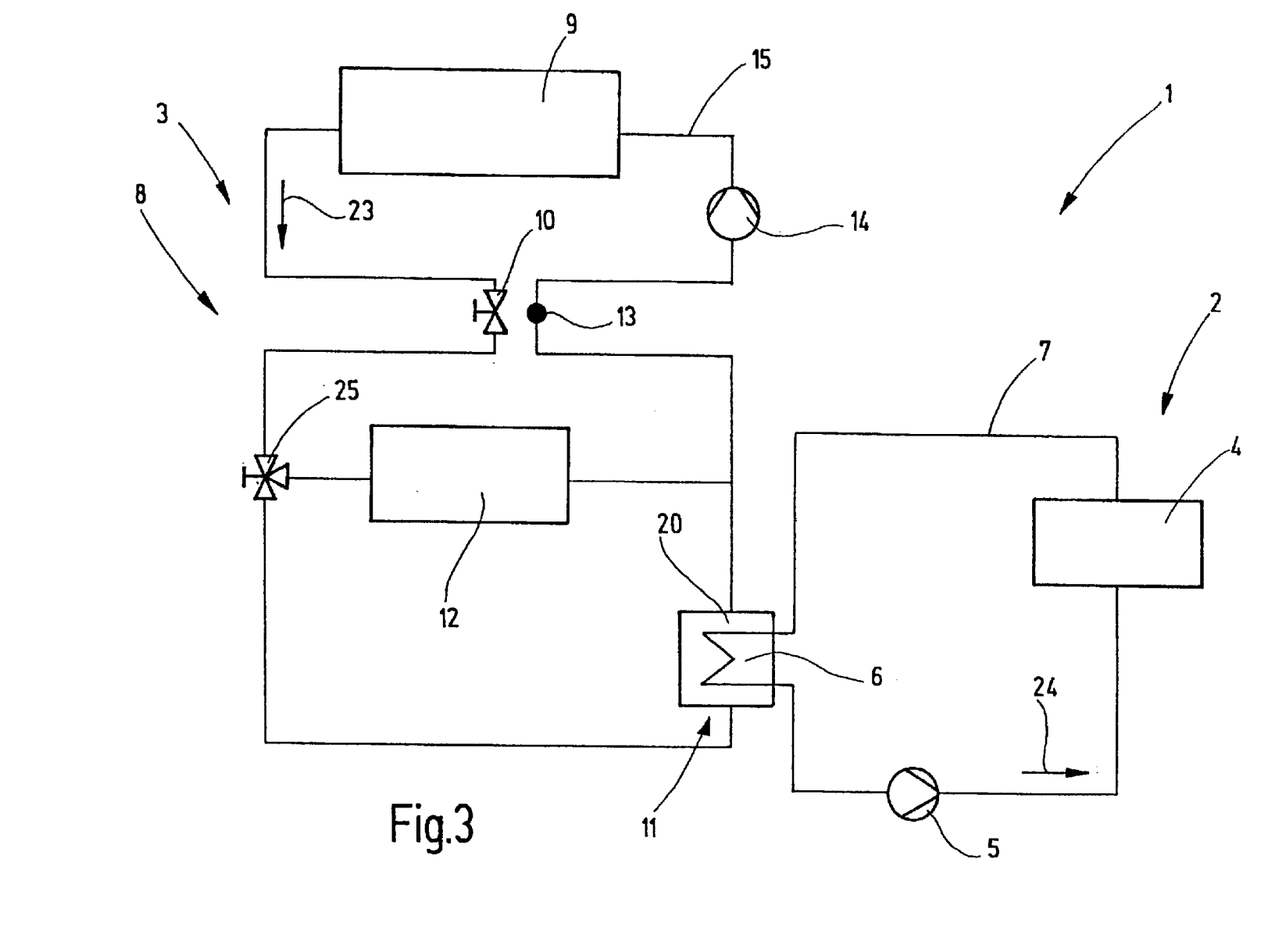
FIG. 3 is a schematic diagram of a vehicle cooling system, in which two evaporators are connected in parallel.

The exemplary embodiment in FIG. 3 differs from the exemplary embodiments in FIGS. 1 and 2 in that the first evaporator 12 and the second evaporator 20 are connected in parallel with one another in the refrigeration circuit 3. The quantity of the refrigerant mass flow injected into the two evaporators 12 and 20 connected in parallel is injected according to the (common) overheating measurement. By means of a 3-way valve 25, which connects the common expansion valve 10 to the first evaporator 12 and to the second evaporator 20, it is possible to adjust the mass flows of the refrigerant 15 separately. Thus it is also possible, for example, to switch one of the parallel lines on or off or to adjust it to certain values.

Figure 4:
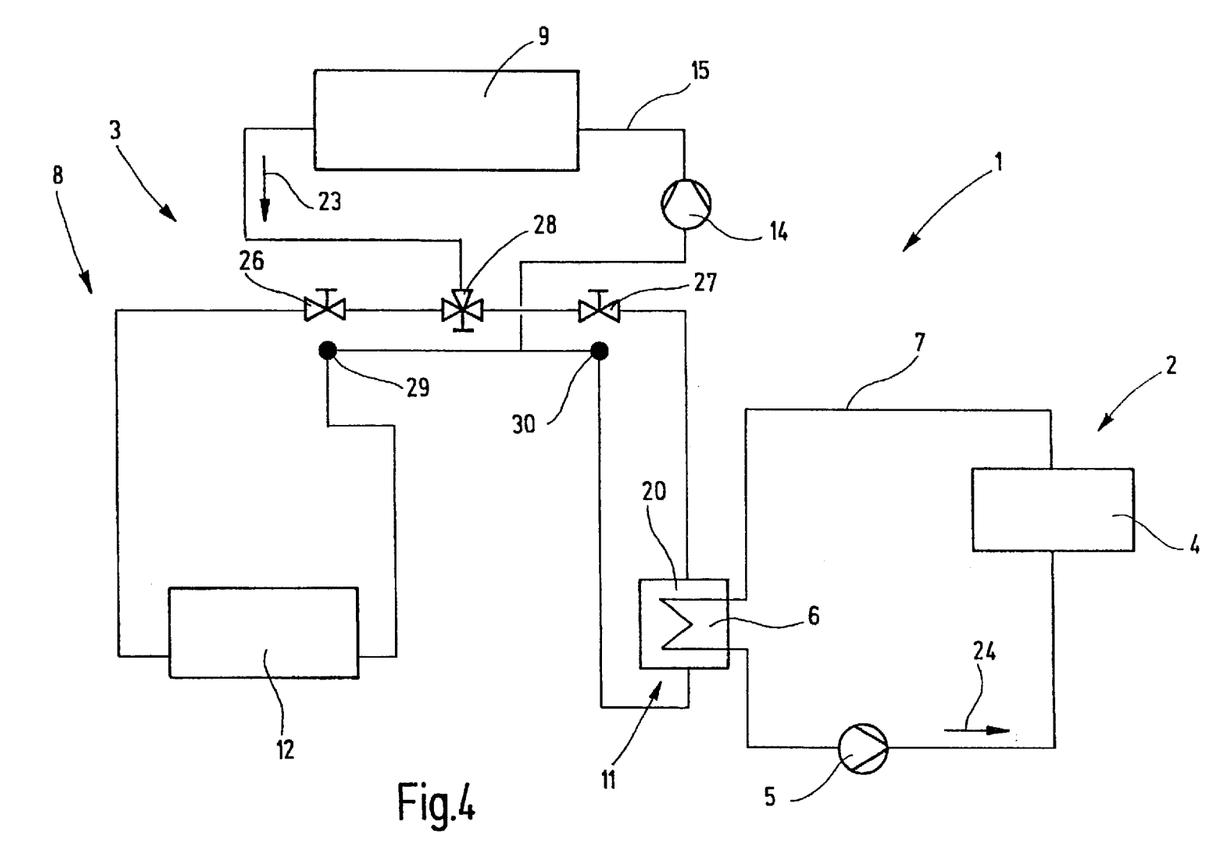
FIG. 4 is a schematic diagram of a further exemplary embodiment of a vehicle cooling system.

The exemplary embodiment in FIG. 4 differs from the exemplary embodiment in FIG. 3 in that, although the two evaporators 12 and 20 in the refrigeration circuit 3 are likewise connected in parallel, the refrigerant mass flows for both evaporators 12 and 20 can each be controlled or regulated by a separate expansion valve. The two expansion valves are identified by the reference numbers 26 and 27 in FIG. 4. The arrangement is designed in such a way that the refrigerant 15 coming from the condenser 9 first passes to a 3-way valve 28, from which it is distributed to the two expansion valves 26 and 27. In this way, the two sub-circuits can be adjusted or switched on and off separately. Furthermore, it is possible to control or regulate the two expansion valves 26 and 27 separately, the overheating at two overheating measuring points 29 and 30 being intended as control variables. In terms of the flow, the overheating measuring point 29 is situated downstream of the first evaporator 12, and the overheating measuring point 30 downstream of the second evaporator 20. The measurement at the overheating measuring point 29 interacts with the expansion valve 26, and the measurement at the overheating measuring point 30 with the expansion valve 27. It is possible, for example, through corresponding adjustment of the expansion valves 26 and 27, to set the same overheating temperatures in both sub-circuits. Running in an asymmetric operating mode is naturally also possible.

Figure 5:
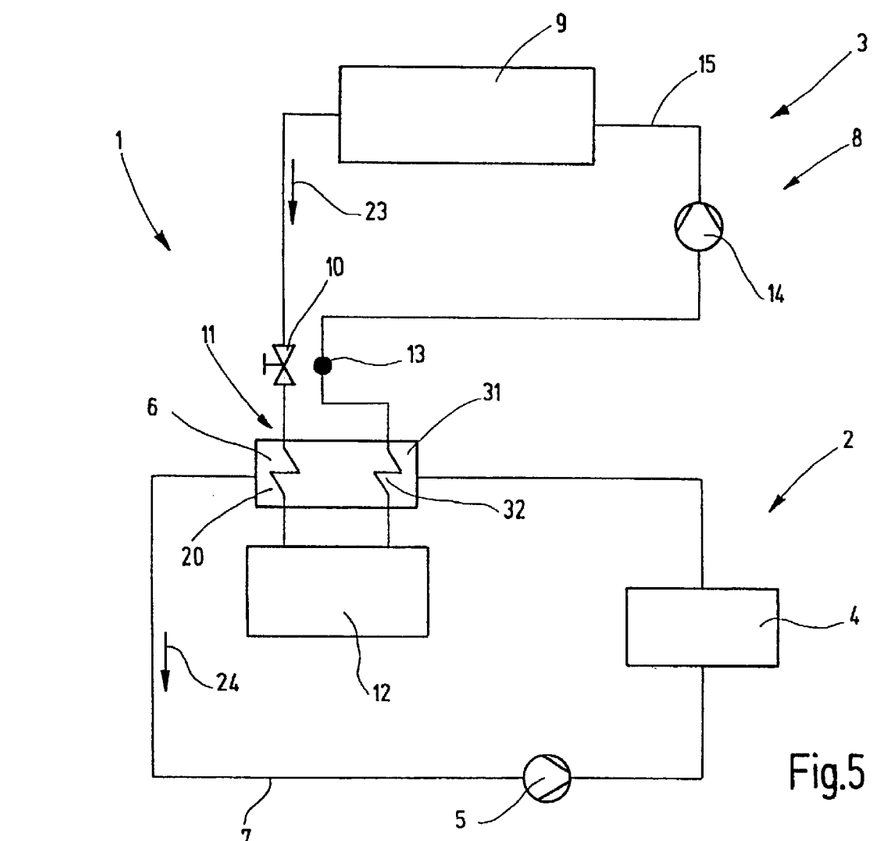
FIG. 5 is a schematic diagram of a vehicle cooling system in which three evaporators are provided.

The exemplary embodiment in FIG. 5 provides for a coolant-refrigerant temperature exchange both upstream and downstream of the first evaporator 12, that is to say, the air-conditioning evaporator (first evaporator 12) assigned to the air-conditioning system 8 is connected downstream of the first heat exchanger 6 and upstream of a second heat exchanger 31, which is jointly responsible for the heat exchange between a third evaporator 32 carrying refrigerant 15 and the cooling circuit 2. More specifically, the refrigerant 15 passes from the expansion valve 10 to the second evaporator 20 of the first heat exchanger 6, then to the first evaporator 12 and then to the third evaporator 32 of the second heat exchanger 31. From there the refrigerant 15 then flows past the overheating sensor 13, the expansion valve 10 and the compressor 14 to the condenser 9.

Figure 6:
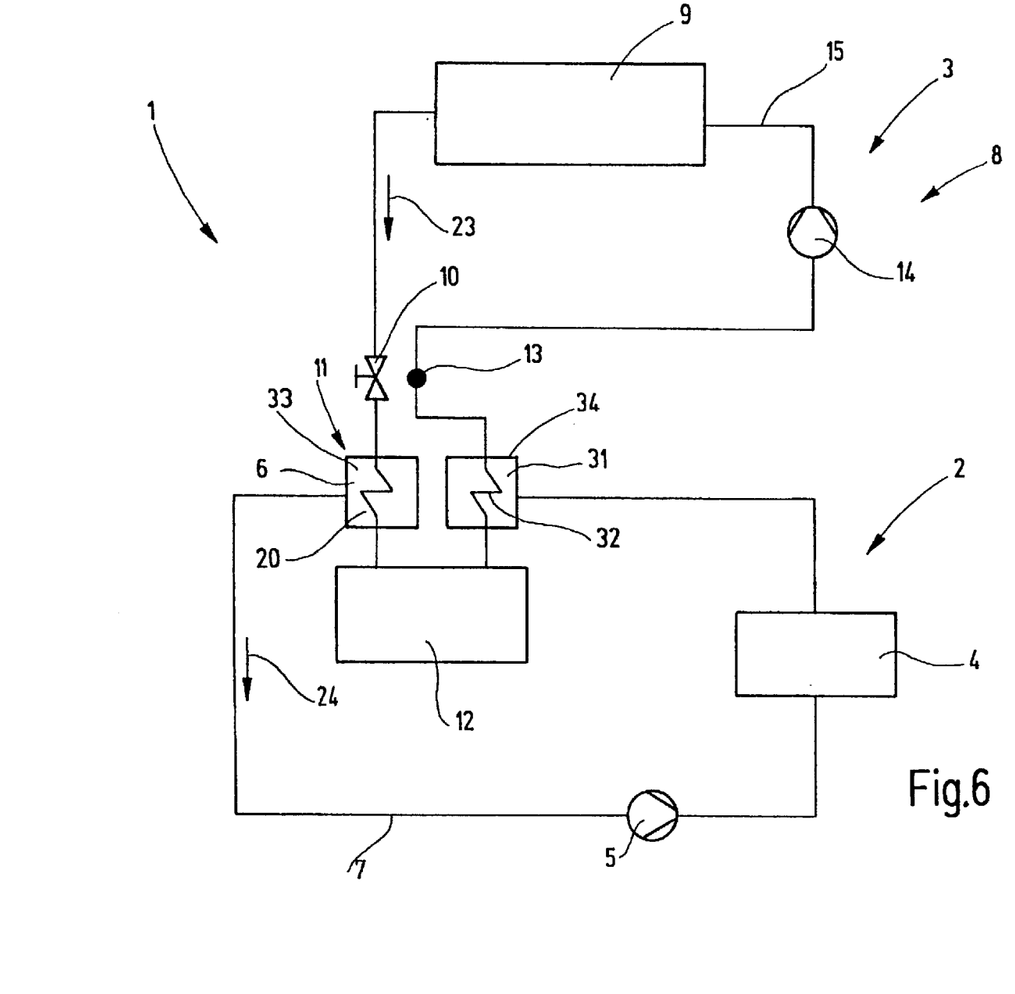
FIG. 6 is a schematic diagram of a vehicle cooling system corresponding to FIG. 5, but with separated evaporators.

Whereas in the exemplary embodiment in FIG. 5, the first and the second heat exchangers 6, 31 form a common unit, according to FIG. 6 it is also possible for the first and the second heat exchangers 6, 31 to form separate elements 33 and 34. This results in two separate heat exchangers, which are incorporated upstream and downstream of the actual air-conditioning evaporator (first evaporator 12).

In order to be able to dissipate the additional thermal load of the cooling circuit 2 via the air-conditioning cycle (refrigeration circuit 3) of the air-conditioning system 8, without significantly impairing the efficiency of the air-conditioning system 8, the compressor 14 must deliver a larger refrigerant mass flow. In addition, the condenser 9 should be designed significantly larger than in air-conditioning systems that are designed solely for cooling the passenger compartment of the vehicle. Given only low thermal loads of the temperature-raising device 4 of less then 1 to 1.5 kW, operation of the air-conditioning system 8 is possible without significant impairment. If, on the other hand, the heat input rises to approximately 2 kW due to the temperature-raising device 4, the air-conditioning output of the air-conditioning system 8 may be adversely affected. In order to counteract this, it is possible to insert additional heat exchangers, in particular air-coolant heat exchangers, into the cooling circuit 2. In the case of the exemplary embodiment in FIG. 7, which shows the entire cooling circuit 2 but only sections of the refrigeration circuit 3, an additional radiator 35 is provided. This lies parallel to the first heat exchanger 6. By means of a 3-way valve 36, the coolant mass flow can be correspondingly divided up or shut off, so that the flow passes through the first heat exchanger 6 and the first additional radiator 35, as required.

Figure 7:
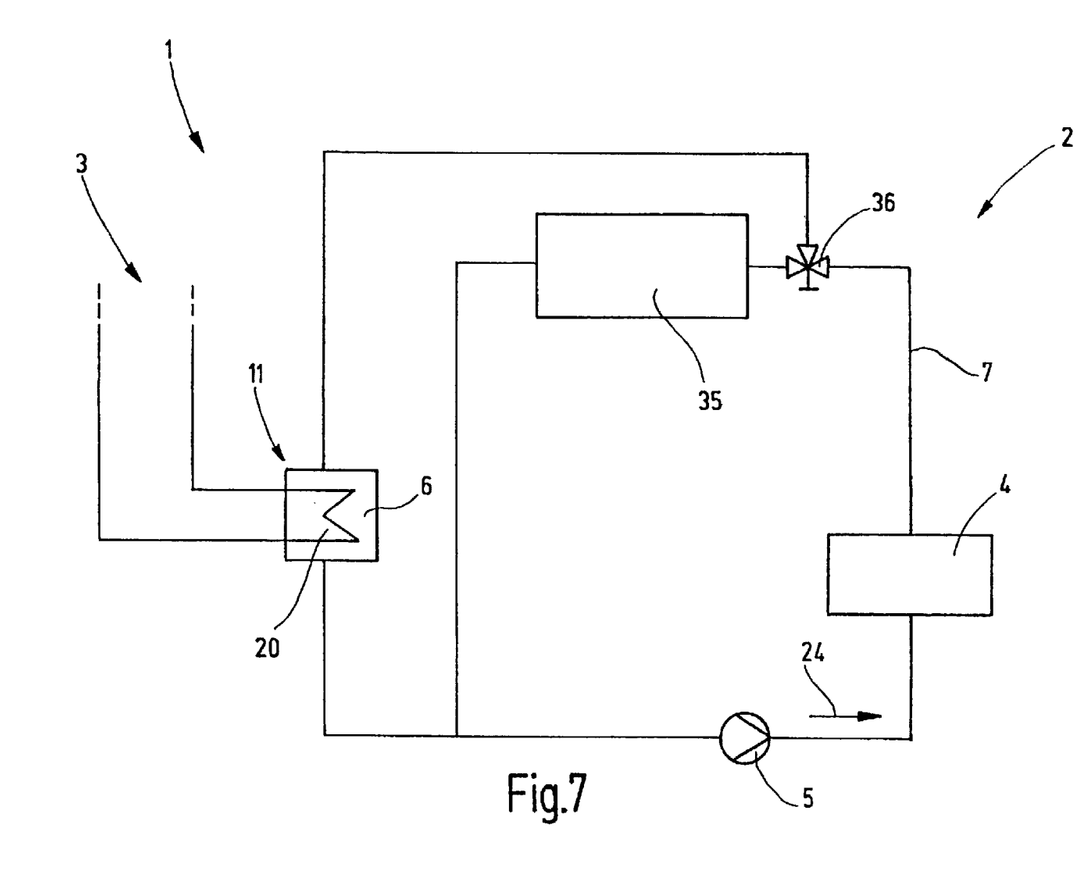
FIG. 7 is a schematic diagram of a portion of a vehicle cooling system, in which an additional radiator for the coolant is arranged in the cooling circuit.
Figure 8:
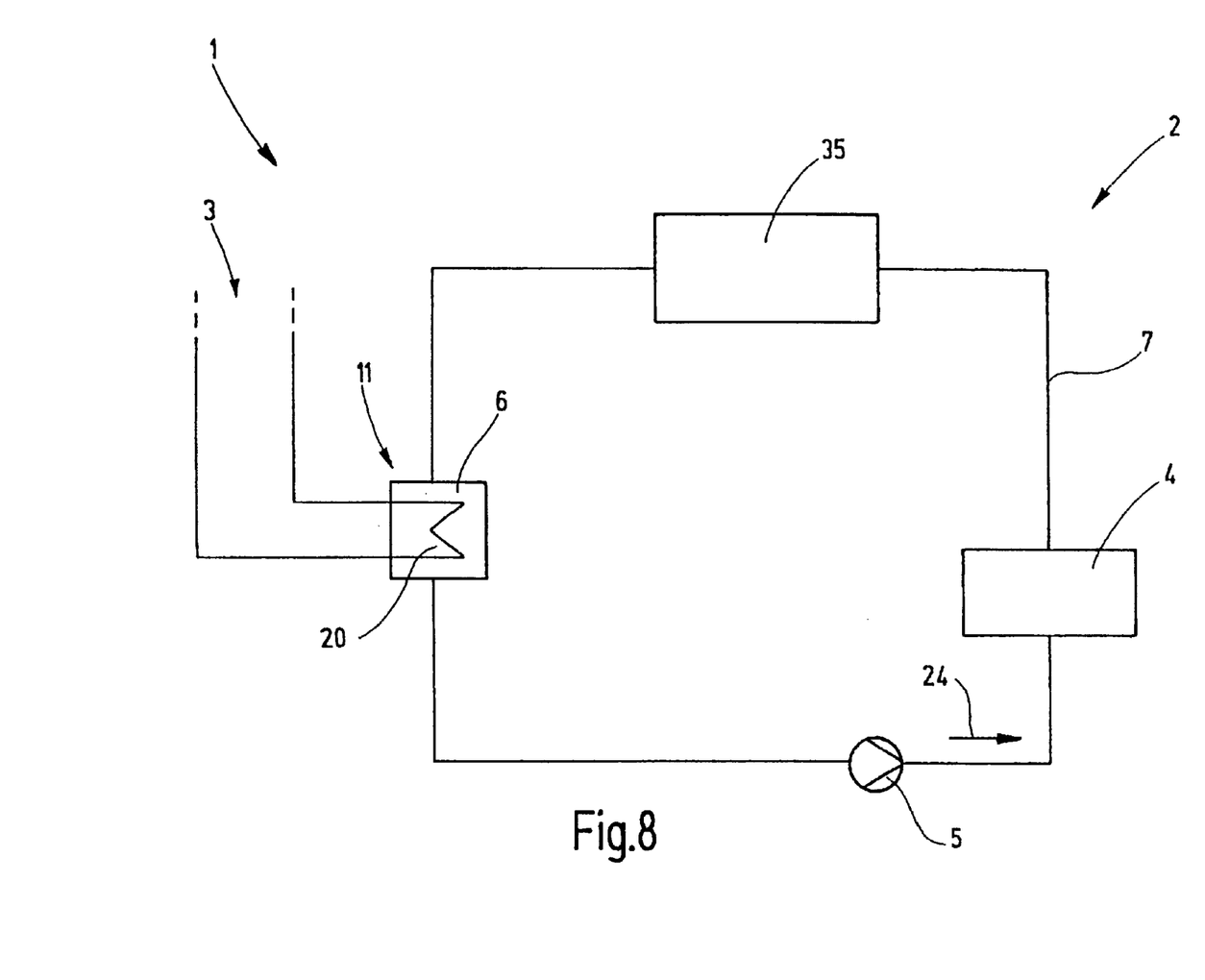
FIG. 8 is a schematic diagram of a further variant of the exemplary embodiment in FIG. 7.

In an alternative to the exemplary embodiment in FIG. 7, however, the radiator 35 can also be connected in series with the first heat exchanger 6. The additional radiator 35 may preferably take the form of an air-cooled radiator, that is to say, it is arranged in the air flow of the vehicle and/or situated in the cooling air flow of a fan. Where the weather results in higher air temperatures, it is possible that no air at all would be admitted to the air-cooled radiator in the exemplary embodiment in FIG. 8, in which case cooling of the temperature-raising device 4 instead is undertaken solely by the first heat exchanger 6. In such a case it is possible, however, to draw the cooling air out of the passenger compartment, since owing to the air-conditioning system 8 this air has a lower temperature level than the outside air. Such an intake from the passenger compartment preferably occurs whenever the air therein is cooler than approximately 25 to 30° C. If the outside air temperature is less than said temperature range of 25 to 30° C., it is also possible, alternatively or in addition, to admit a flow of ambient air to the radiator 35. Alternatively or in addition it is possible to apply water to the heat exchanger surface of the radiator 35, in order to increase or boost the cooling capacity through evaporative cooling. This water might originate from a storage reservoir carried by the vehicle, which is in particular also filled with condensate water from the air-conditioning system 8. The condensate water is precipitated on the air-conditioning evaporator (first evaporator 12) of the air-conditioning system due to cooling.

Figure 9:
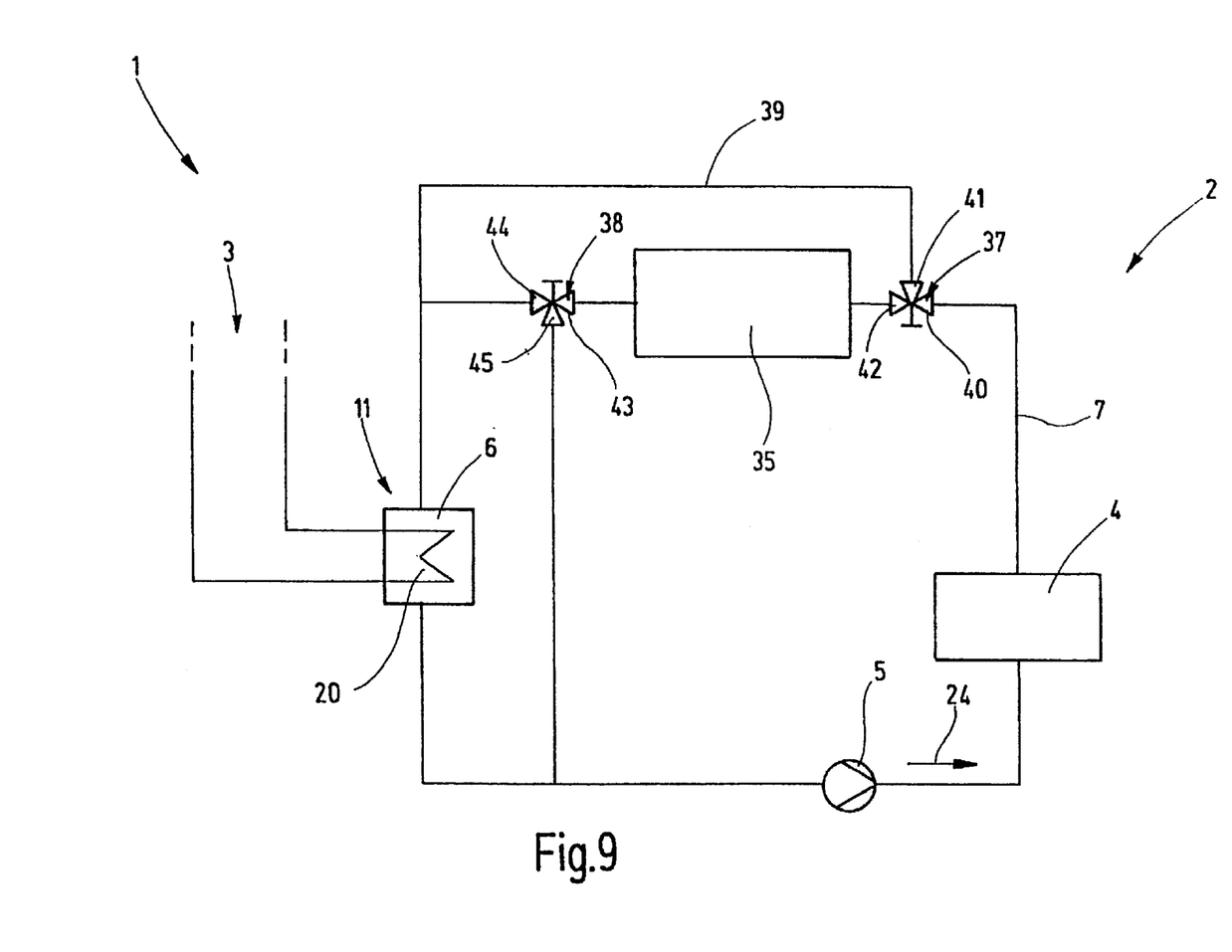
FIG. 9 is a schematic diagram of a further variant of the exemplary embodiments in FIGS. 7 and 8.

FIG. 9 shows an exemplary embodiment in which the radiator 35 and the first heat exchanger 6 can be switched on and off or the coolant volumetric flow can be adjusted according to the thermal load and cooling air temperature. The facility for switching the two heat exchangers (radiator 35, first heat exchanger 6) on and off or adjusting them has particular advantages for summer and winter operation. In summer, at high air temperatures in excess of approximately 25 to 30° C., only pure heat dissipation via the air-conditioning cycle (refrigerant circuit 3) is advisable. For this setting the exemplary embodiment in FIG. 9 has two 3-way valves 37, 38, which are situated on the inlet and outlet side of the radiator 35. A branch 40 of the 3-way valve 37 is connected to the temperature-raising device 4. A further branch 41 leads to the bypass 39. A branch 42 of the 3-way valve 37 leads to the inlet of the radiator 35. A branch 43 of the 3-way valve 38 leads to the outlet of the radiator 35. A branch 44 of the 3-way valve 48 is connected to the bypass 39 and to the first heat exchanger 6. A branch 45 of the 3-way valve 38—bypassing the first heat exchanger 6—leads to the circulating pump 5.

Figure 10:
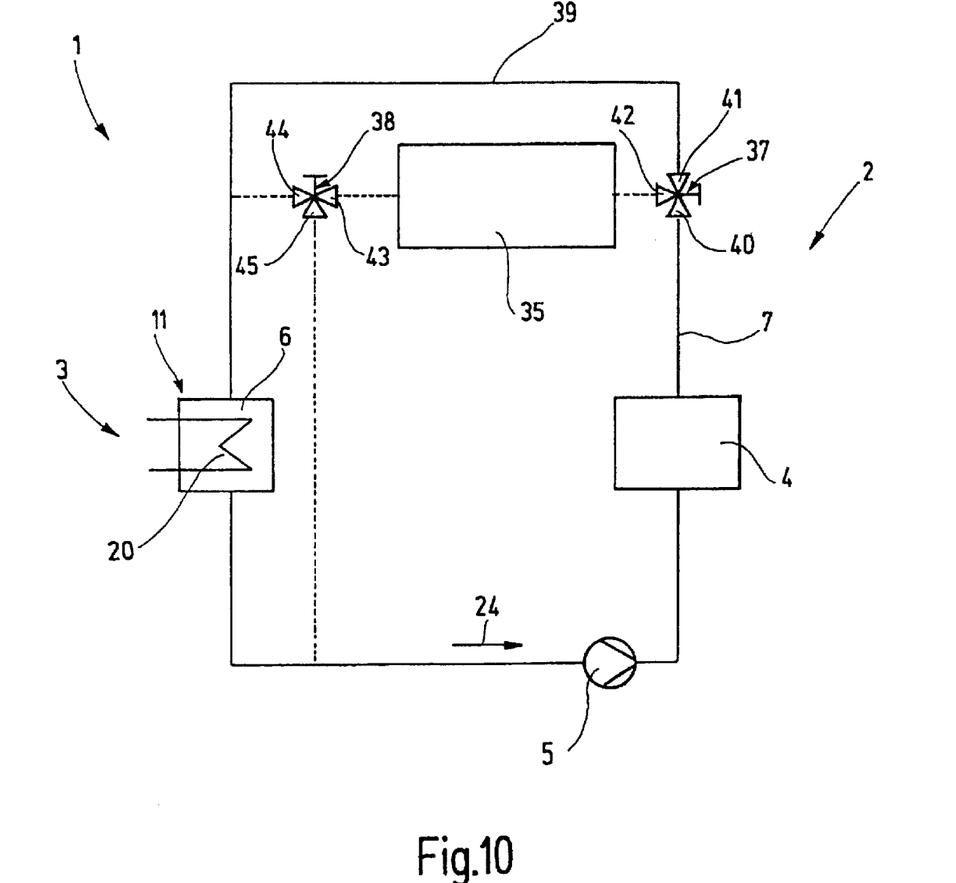
FIGS. 10 to 12 are schematic diagrams showing various operating conditions for the exemplary embodiment in FIG. 9.
Figure 11:
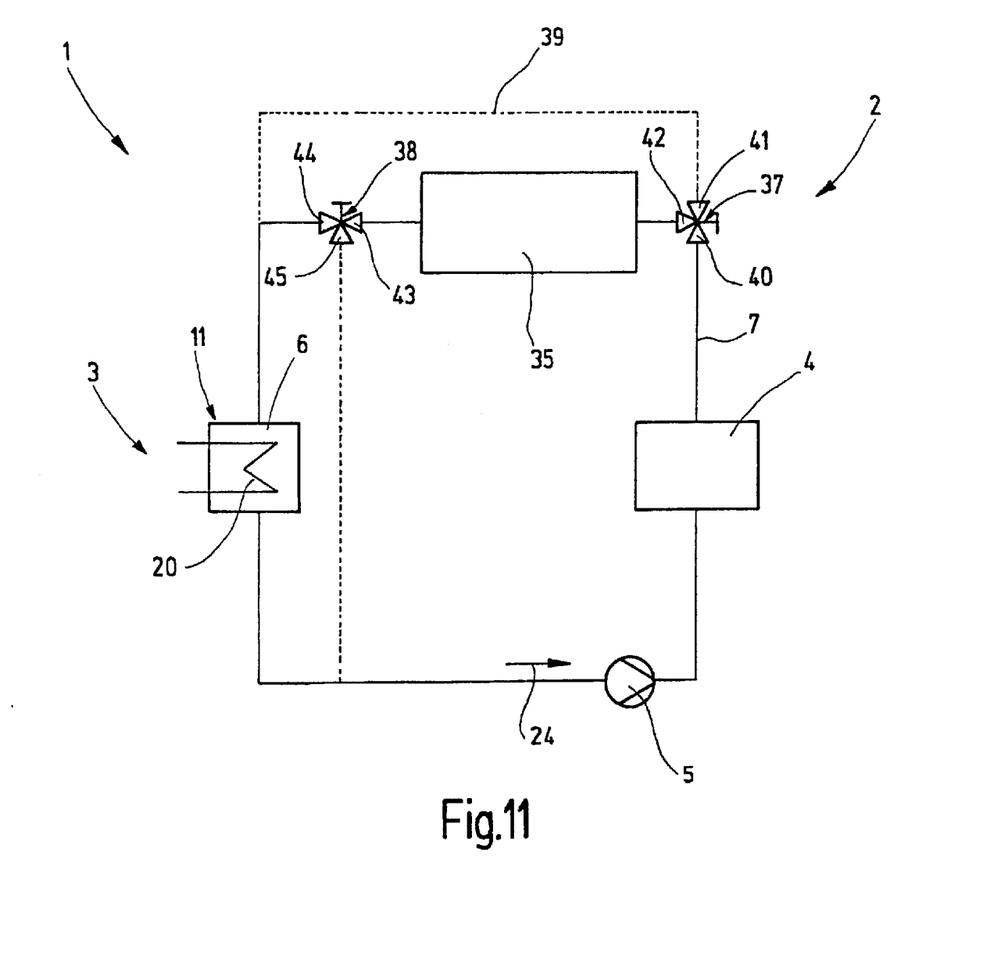
Figure 12:
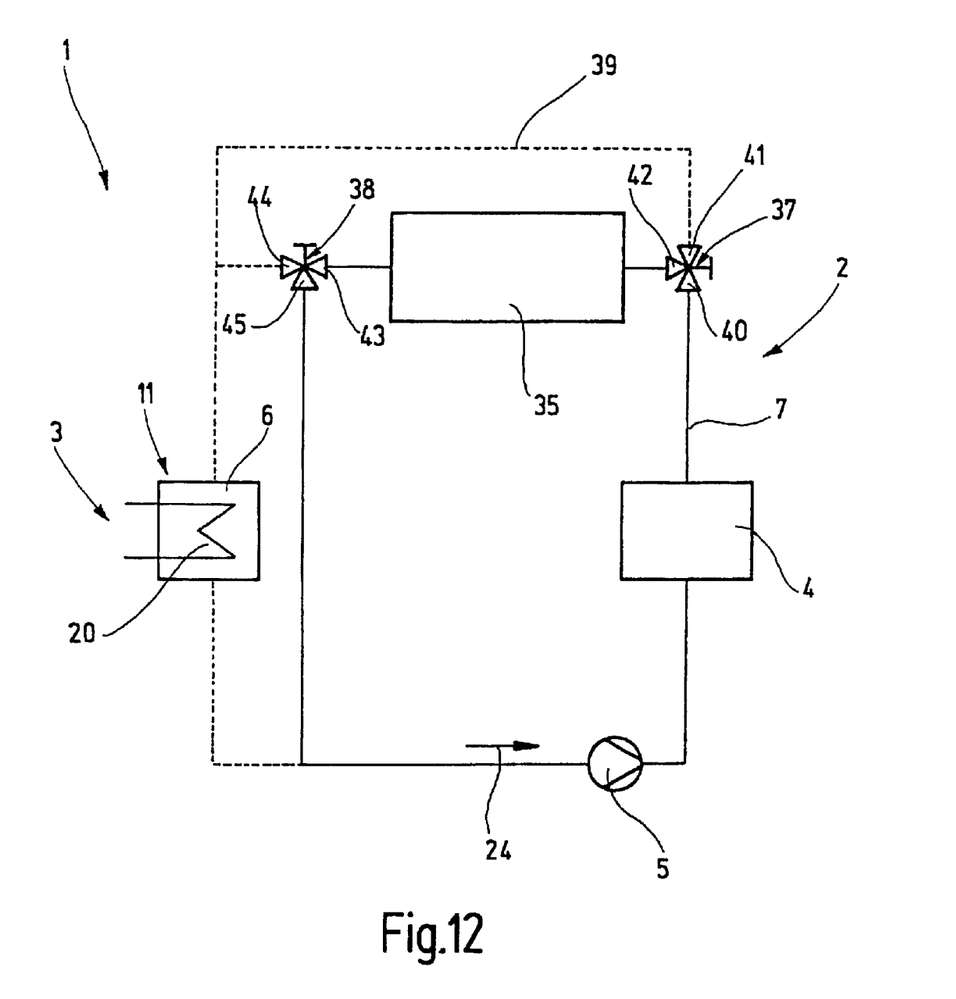

In summer, at high air temperatures in excess of approximately 25 to 30° C., only pure heat dissipation from the temperature-raising device 4 by way of the refrigeration circuit 3 is desirable. In such a case the two 3-way valves 37 and 38 are adjusted in such a way that the situation according to FIG. 10 arises. The dashed lines mean that these branches are not functioning. The additional radiator 35 is therefore inoperative; all the coolant 7 flows through the first heat exchanger 6. Should moderate air temperatures (approx. 15 to 25° C.) prevail, however, it is possible to reduce the temperature of the coolant 7 both via the radiator 35 and via the first heat exchanger 6. This situation is represented in FIG. 11. The coolant 7 coming from the temperature-raising device 4 flows through the radiator 35 and then the first heat exchanger 6 at full volumetric flow. If, in winter, the air cooling by means of the radiator 35 alone is possibly not sufficient to dissipate the thermal load from the temperature-raising device 4, the operation according to FIG. 12 is initiated. The coolant 7 flows through the radiator 35 at full volumetric flow and from there back to the circulating pump 5. The 3-way valve 38 is accordingly set in such way that the coolant 7 bypasses the first heat exchanger 6.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A cooling system for a temperature-raising device of a vehicle having an air-conditioning system that serves for air-conditioning of the passenger compartment of the vehicle and that includes a refrigeration circuit that circulates refrigerant, comprising:
   a cooling circuit for cooling the temperature-raising device, the cooling circuit circulating a liquid coolant for cooling the temperature-raising device and including a first heat exchanger for exchanging heat between the coolant and the refrigerant; wherein the first heat exchanger is integrated into the refrigeration circuit so that during a refrigeration cycle all of the refrigerant passing through the first heat exchanger exchanges heat with air being supplied to the passenger compartment.

2. A vehicle cooling system as claimed in claim 1, wherein the liquid coolant retains its physical state at all times.

3. A vehicle cooling system as claimed in claim 1, wherein the cooling circuit comprises at least one circulating pump.

4. A vehicle cooling system as claimed in claim 1, wherein the refrigeration circuit of the air-conditioning system comprises at least one compressor, at least one condenser, at least one expansion valve and at least one first evaporator serving for air-conditioning.

5. A vehicle cooling system as claimed in claim 4, wherein a part of the first heat exchanger forms a second evaporator.

6. A vehicle cooling system as claimed in claim 5, wherein the first and the second evaporators are separate elements.

7. A vehicle cooling system as claimed in claim 5, wherein the first and the second evaporators form one unit.

8. A vehicle cooling system as claimed in claim 5, wherein at least one of the first and the second evaporators further includes a bypass.

9. A vehicle cooling system as claimed in claim 8, wherein the at least one bypass comprises a control or regulating valve.

10. A vehicle cooling system as claimed in claim 5, further comprising a third evaporator, situated downstream of the first evaporator, in the direction of flow of the refrigerant, and forming an integral part of a second heat exchanger for cooling the temperature-raising device.

11. A vehicle cooling system as claimed in claim 10, wherein the first and the second heat exchangers are separate elements.

12. A vehicle cooling system as claimed in claim 10, wherein the first and the second heat exchangers form one unit.

13. A vehicle cooling system as claimed in claim 4, wherein the expansion valve is arranged between the condenser and the first or second evaporator.

14. A vehicle cooling system as claimed in claim 13, further comprising an overheating measuring point for determining an overheating measurement for controlling or regulating the expansion valve, said measuring point being situated between the first or second evaporator and the compressor.

15. A vehicle cooling system as claimed in claim 1, wherein the cooling circuit comprises at least one additional radiator for the coolant.

16. A vehicle cooling system as claimed in claim 15, wherein the first and/or second heat exchangers and the radiator are connected in parallel.

17. A vehicle cooling system as claimed in claim 15, wherein the first and/or second heat exchangers and the radiator are connected in series.

18. A cooling system, for a temperature-raising device of a vehicle having an air-conditioning system that serves for air-conditioning of the passenger compartment of the vehicle and that includes a refrigeration circuit, comprising:
   a cooling circuit for cooling the temperature-raising device, the cooling circuit being designed for circulating a liquid coolant for cooling the temperature-raising device;
   wherein the liquid coolant is thermally integrated via a first heat exchanger with the refrigerant of the air-conditioning system;
   wherein a part of the first heat exchanger associated with the refrigeration circuit of the air-conditioning system forms a second evaporator; and
   wherein the first evaporator is situated either upstream or downstream of the second evaporator.

19. A method for cooling a temperature-raising device in a vehicle having a passenger compartment, comprising:

cooling the vehicle device by a circulated liquid coolant; and directly exchanging heat between the coolant and a refrigerant of an air-conditioning system for air-conditioning the passenger compartment of the vehicle; and wherein the refrigerant that exchanges heat with the coolant also exchanges heat with the air being supplied to the passenger compartment in the same refrigeration cycle.

20. A method as claimed in claim 19, wherein the temperature-raising device comprises a drive battery or fuel cell in a vehicle operating either as an electric vehicle and/or a hybrid vehicle.

21. A vehicle having a passenger compartment, comprising:

a temperature-raising device comprising at least one of a drive battery and a fuel cell as part of the propulsion unit for the vehicle;

an air-conditioning system that serves for air-conditioning the passenger compartment of the vehicle and that includes a refrigeration circuit that circulates refrigerant; and     a cooling system for the temperature-raising device comprising a cooling circuit circulating a liquid coolant for cooling the temperature-raising device and including a first heat exchanger for exchanging heat between the coolant and the refrigerant; wherein the first heat exchanger is integrated into the refrigeration circuit so that during a refrigeration cycle all of the refrigerant passing through the first heat exchanger exchanges heat with air being supplied to the passenger compartment.

\* \* \* \* \*